(12) United States Patent
Watanabe et al.

(10) Patent No.: US 7,010,910 B2
(45) Date of Patent: Mar. 14, 2006

(54) EXHAUST GAS PURIFICATION APPARATUS

(75) Inventors: Hiroko Watanabe, Oarai (JP); Osamu Kuroda, Hitachi (JP); Yuichi Kitahara, Hitachinaka (JP); Norihiro Shinotsuka, Hitachinaka (JP); Masayuki Kamikawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 37 days.

(21) Appl. No.: 10/705,921

(22) Filed: Nov. 13, 2003

(65) Prior Publication Data

US 2004/0093861 A1    May 20, 2004

(30) Foreign Application Priority Data

Nov. 14, 2002    (JP) ............................. 2002-330180

(51) Int. Cl.
*F01N 3/10* (2006.01)

(52) U.S. Cl. ............................ 60/300; 60/287; 60/288; 60/297; 60/298; 60/301; 60/311

(58) Field of Classification Search .................. 60/274, 60/286, 287, 288, 289, 298, 300, 301, 303, 60/295, 297, 311
See application file for complete search history.

(56) References Cited

U.S. PATENT DOCUMENTS

| | | | |
|---|---|---|---|
| 4,530,418 A | | 7/1985 | Curtis |
| 5,052,178 A | * | 10/1991 | Clerc et al. ................... 60/274 |
| 5,121,601 A | * | 6/1992 | Kammel ....................... 60/275 |
| 5,388,406 A | * | 2/1995 | Takeshima et al. ........... 60/297 |
| 5,473,887 A | | 12/1995 | Takeshima et al. |
| 5,746,989 A | * | 5/1998 | Murachi et al. ......... 423/213.7 |
| 5,822,977 A | * | 10/1998 | Fukuda et al. ................. 60/274 |
| 5,974,791 A | * | 11/1999 | Hirota et al. .................. 60/276 |
| 6,032,461 A | * | 3/2000 | Kinugasa et al. .............. 60/295 |

FOREIGN PATENT DOCUMENTS

| EP | 1 065 352 A2 | 1/2001 |
|---|---|---|
| EP | 1 132 587 A2 | 9/2001 |
| JP | 63-65927 A | 3/1988 |
| JP | 2600492 | 1/1997 |
| JP | 09-137716 | 5/1997 |
| JP | 10-212933 | 8/1998 |
| JP | 11-125113 | 5/1999 |
| JP | 11-125113 A | 5/1999 |
| JP | 2001-073748 | 3/2001 |
| WO | WO 00/28196 A1 | 5/2000 |
| WO | WO 01/04466 A1 | 1/2001 |
| WO | WO 02/29218 A1 | 4/2002 |

* cited by examiner

*Primary Examiner*—Binh Q. Tran
(74) *Attorney, Agent, or Firm*—Crowell & Moring LLP

(57) ABSTRACT

An exhaust gas purification apparatus for purifying exhaust gas exhausted from a diesel internal combustion engine and containing therein harmful substances including particulates, NOx, HC and CO, at least, comprises a removal part for trapping and removing particulates in the exhaust gas, a purification part for purifying NOx, HC and CO through contact, and a heat transfer part for transferring heat generated in the removal part to the purification part.

14 Claims, 6 Drawing Sheets

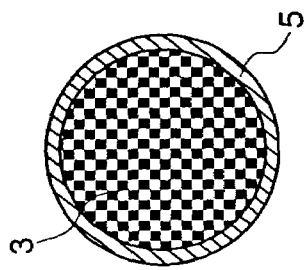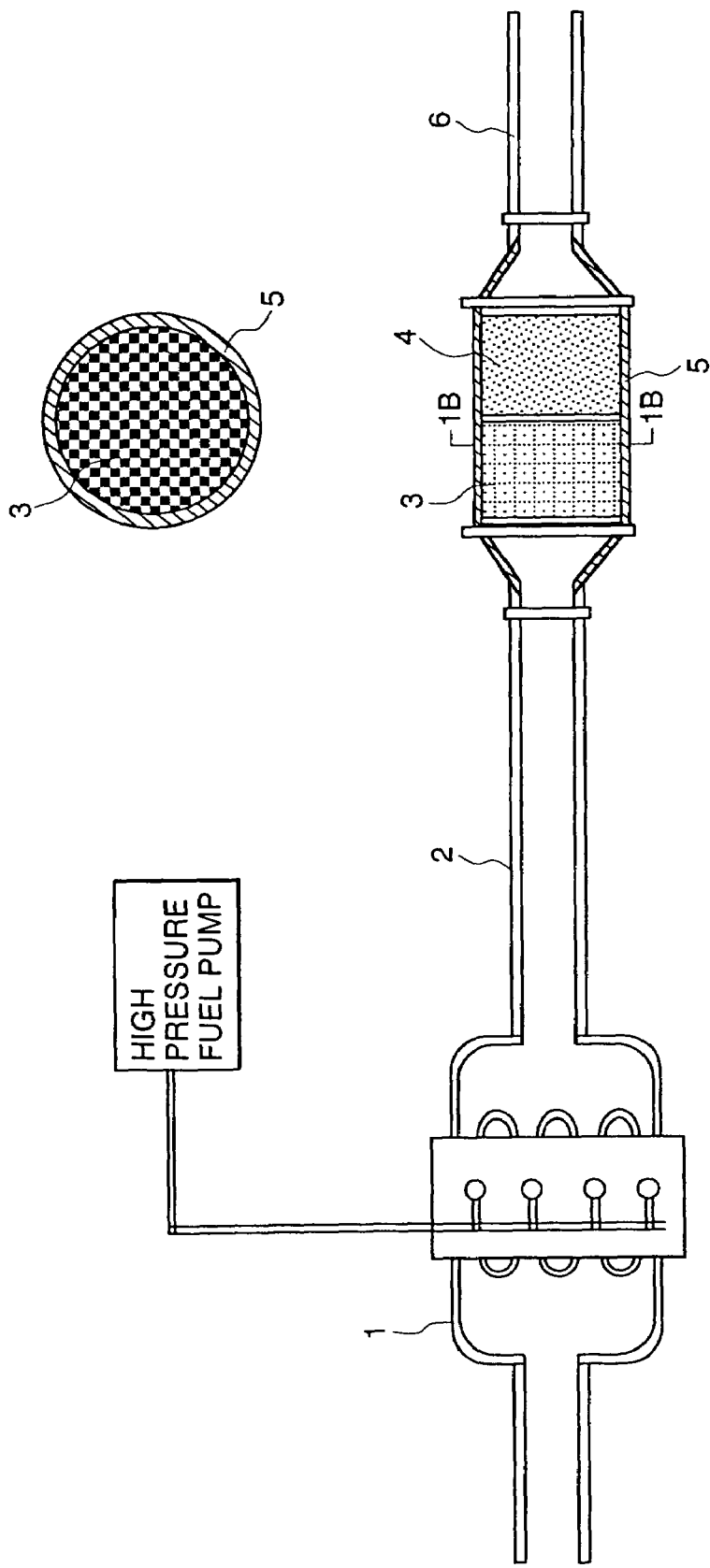

EXHAUST GAS PURIFICATION APPARATUS

BACKGROUND OF THE INVENTION

1. Technical Field of the Invention

The present invention relates to an exhaust gas purification apparatus.

2. Description of Prior Arts

Development of a lean NOx catalyst as a catalyst for effectively purifying NOx in lean burn combustion exhaust gas in which oxygen coexists is progressed, and a catalyst which traps NOx on an adsorbent once, and then performs reduction purification of the trapped NOx is developed and its adoption is being expanded.

Upon mounting this lean NOx catalyst on a diesel vehicle which performs lean combustion, a working temperature of the catalyst does not necessary cope with the temperature of exhaust gas of the diesel engine. That is, the exhaust gas of the diesel engine is low in temperature by about 100° C. than that of a gasoline engine, so that NOx in the exhaust gas is not necessary effectively purified by the same layout and use manner as the gasoline engine. Therefore, a method of optimizing the temperature of lean NOx catalyst by using a heat accumulator, is disclosed in JP 11-125113 A.

Further, in the diesel engine, fuel is injected directly into the combustion chamber, so that particle-shaped substances which are called particulates (PM) are generated. PM comprise soot generated from fuel having not contacted with air during fuel combustion, SOF (soluble organic fraction) caused by fuel impinged on a wall of apparatus or the like and lubrication oil, sulfur oxides generated from sulfur in the fuel, etc. PM cause sever injury in respiratory organs and are substances which are unavoidable to be purified in purification of diesel exhaust gas.

As PM reducing measures, there is a method of trapping PM with a filter which is a diesel particulate filter (DPF), and regenerating the filter by burning PM when pressure loss of the filter increased by accumulation of PM.

A method of using a heater to burn PM trapped by DPF is disclosed in JP 2001-73748 A or JP 9-137716 A.

[Patent Literature 1]
JP 11-125113 A
[Patent Literature 2]
JP 2001-73748 A
[Patent Literature 3]
JP 9-137716 A
[Patent Literature 4]
JP 10-212933 A
[Patent Literature 5]
Japanese patent No. 2600492

In the method of JP 11-125113 A, a heat accumulator is provided only on the outer periphery of a NOx catalyst, JP 11-125113 A is silent on heat utilization in the other construction as described later.

JP 2001-73748 A and JP 9-137716 A each are silent on temperature raising of the other construction by utilizing combustion heat of PM, as described later.

SUMMARY OF THE INVENTION

The invention is made in view of the above-mentioned subject of the prior arts, and an object of the invention is to provide an apparatus for and a method of removing un-burnt components such as particulates by DPF, and holding the temperature of exhaust gas purification catalyst such as a lean NOx catalyst in an effective working range and controlling temperature raising of DPF by using its combustion heat, thereby to prevent thermal deterioration of the catalyst.

The present invention for solving the above-mentioned subject resides in an exhaust gas purification apparatus for purifying exhaust gas exhausted from a diesel internal combustion engine and containing therein harmful substances including particulates, NOx, HC and CO, at least, which exhaust gas purification apparatus comprises a removal part for trapping and removing at least particulates in the exhaust gas, a purification part for purifying NOx, HC and CO through contact, and a heat transfer part for transferring heat generated in the removal part to the purification part.

BRIEF DESCRIPTION OF THE DRAWINGS

FIG. 1A is a sectional view of an exhaust gas purification apparatus of an embodiment of the present invention;

FIG. 1B is a sectional view of the exhaust gas purification apparatus, taken along a line 1B—1B;

EXPLANAITION OF SYMBOLS

1 . . . diesel engine, 2, 6, 6a . . . exhaust flow path, 3 . . . DPF, 4 . . . exhaust gas purifying catalyst, 5 . . . container, 7 . . . exhaust gas temperature raising part, 8 . . . good heat conductor, 9 . . . DPF-exhaust gas purifying catalyst integrated structural body, 10 . . . heat accumulating material

DESCRIPTION OF EMBODIMENTS OF THE INVENTION

Figure 9:
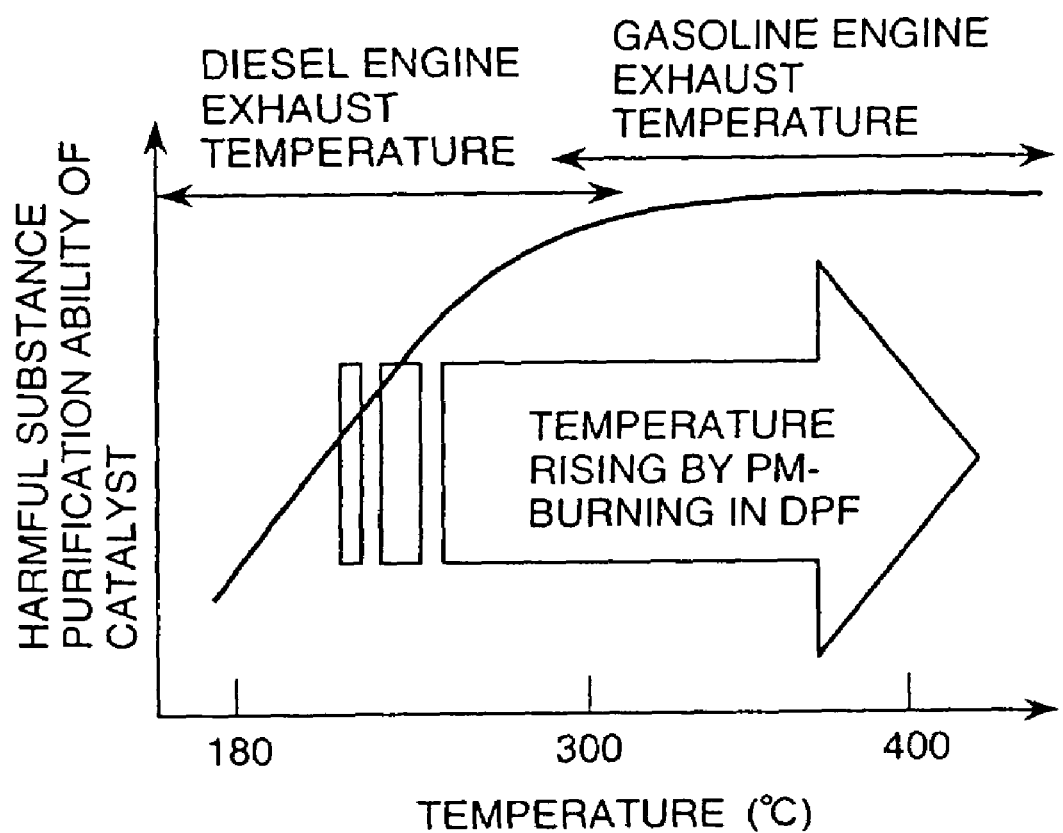
FIG. 9 is a diagrammatic illustration showing relations between exhaust gas temperatures from an engine and harmful substance purifying ability (NOx purification rate) of a catalyst.

FIG. 9 is a diagrammatic illustration showing a difference in exhaust temperature property between diesel engine and gasoline engine, and a relation between harmful substance purification ability of a vehicle catalyst and the exhaust temperature properties. The vehicle catalyst, generally, effectively functions at a temperature higher than 250–300° C. In the case of a gasoline engine, the effective temperature range can be selected by devising a catalyst layout or the like.

On the other hand, the diesel engine exhaust temperature is lower by about 100° C. than the gasoline engine exhaust temperature, and it is difficult to select an effective temperature range for the catalyst. Therefore, in the present invention, attention is paid on raising the temperature of exhaust gas and/or catalyst by combustion heat of particulates or the like trapped by the DFP, a concrete apparatus and method therefor are proposed.

The present invention is an exhaust gas purification apparatus for purifying exhaust gas containing therein harmful substances such as PM, NOx, HC, CO, etc., which apparatus is characterized by having, at least, a PM removal means for trapping and removing PM from exhaust gas, a purification means for purifying the NOx, HC, CO, etc. through contact, and a means for transferring heat generated in the PM removal means to the purification means.

Thereby, it is possible to hold the catalyst temperature in an effective working temperature range by transferring the heat generated by combustion of PM to the purification catalyst for the NOx, HC, CO, etc., and bring out sufficient catalyst ability.

Further, although PM combustion for regenerating the DPF is accompanied by abnormal temperature rising, it is possible to suppress the abnormal temperature rising of the DPF by rapidly transferring the heat generated in the PM combustion, and it is possible to prevent troubles such as thermal deterioration, breakage, etc. caused thereby.

For a mechanism, apparatus, or means for transferring heat in the present invention, those based on each principle of conduction, retention and radiation can be applied, particularly, it is preferable to use a means based on fluid transfer which is a kind of conduction and retention.

As the PM removal means according to the present invention, the following can be applied, for instance, however, various modifications also can be applied within the concept of the present invention, or along the object of the present invention or realization of the object:

(1) a monolith honeycomb filter of wall flow type in which an inlet and outlet of extruded honeycomb channel of porous cordierite or SiC sinter are alternately closed;
(2) a ceramic fiber laminated filter of candle type in which ceramic fiber twists around on the outer periphery of perforated stainless pipe;
(3) a cross flow type laminated filter of wall flow type in which extruded plates of porous cordierite are laminated;
(4) a sintered metal filter that plate-like members made by mixing wire and metal power (Cr, Ni containing powder) and sintering it are laminated;
(5) a porous metal body filter using a plurality of porous cylinders of metal (Ni, Cr, Al) each made in a three-dimensional mesh-shape;
(6) a metal wire mesh filter that a stainless wire mesh is formed in a hollow cylinder shape so that exhaust gas flows from the outside to the inside; and
(7) a filter, having a regenerating function, that a catalyst component such as Pt, Pd, etc is supported on each filter of the above-mentioned various kinds of shapes in order to promote combustion of PM.

Although, particularly, there is no limit to the kind of the purification catalyst for NOx, HC, CO, etc in the present invention, a lean burn NOx catalyst which can purify NOx in lean exhaust gas also, a so-called three-way catalyst, a combustion catalyst, a HC adsorption catalyst, an electric catalyst, etc can be applied by being variously modified within the concept of the invention directly or indirectly included.

Although, particularly, there is no limit to the lean NOx catalyst, for example, a lean NOx catalyst disclosed in JP 10-212933 A in which NOx is chemically adsorbed under the condition that an amount of oxidizer is more than reducer in the exhaust gas, and the adsorbed NOx is reduced through contact under the condition that an amount of the reducer is the same as or more than the oxidizer, and a catalyst disclosed in the Japanese patent no 2600492 which has, as a component, a NOx absorbent that NOx is absorbed when exhaust gas is lean and the absorbed NOx is released by lowering the concentration of oxygen in the exhaust gas can be applied for the present invention.

Although, particularly, there is no limit to the three-way catalyst, a catalyst which has Pt, Pd, Rh, cerio, etc, as structural components and can purify NOx, HC and CO in the stoichiometric air-fuel ratio exhaust gas simultaneously can be applied for the present invention.

Although, particularly, there is no limit to the combustion catalyst, a catalyst which has Pt, Pd, etc, as active components and is able to burn HC, CO, etc in the exhaust gas can be applied for the invention.

Hereunder, an example in which the DPF is basically used as the PM removal means and a lean NOx catalyst is used as a catalyst will be explained.

In the present invention, the mechanism, apparatus or means for transferring heat is characterized that it conducts heat transfer through a good heat conductor or a heat conductive member.

For example, as the good heat conductor for heat transfer, there is a metal material such as SUS, carbon steel, alloy steel, iron, cast iron, heat resisting copper, copper, copper alloy, aluminum, aluminum alloy, magnesium alloy, nickel alloy, titan alloy, etc, and by transferring PM combustion heat to the catalyst, it is possible to effectively suppress the temperature rising of DPF and raise the temperature of the catalyst to an optimum temperature range.

For example, it is embodied by a heat transfer device or heat transfer part which is constructed by accommodating the DPF and catalyst in a single converter made of the above-mentioned metal material without providing any heat insulator between an inner wall of the converter and the DPF or catalyst.

Further, the feature of the present invention is characterized by a heat transfer device or heat transfer part connecting the DPF and the catalyst through a good heat conductor of the above-mentioned metal material, etc.

Further, the feature of the present invention can be embodied by the heat transfer device or heat transfer part in which the DPF and the catalyst are made into an integrated structure.

In this case, the feature also can be achieved by using the above-mentioned metal material for a substrate of the DPF and the catalyst.

Further, as the heat transfer device or heat transfer part, it is also a feature of the present invention to conduct heat transfer by using a heat accumulating material.

Basically, regeneration of DPF is continuously conducted and continuously occurs in the case where the DPF itself is made in a catalyst, however, a quantity of heat generation is not always constant because combustion occurs only when a temperature reaches to a predetermined temperature.

Heat generation at the DPF which has not been made catalytic occurs basically only when regeneration is being conducted.

By transferring the heat generated at the DPF through a heat accumulating material, a quantity of heat transfer can be flattened and it is possible to suppress abnormal temperature rising of the DPF and effectively raise the catalyst to a proper temperature.

Further, there is an advantage that a heating effect lasts by providing the heat accumulating material.

Further, by adopting a heat accumulating material in which phase change occurs and selecting or mixing heat accumulating material of which the phase change is within an effective working temperature range of the catalyst, for example, by selecting a heat accumulating material in which the phase change occurs around a central portion of 300–500° C. which is an effective temperature range of a lean NOx catalyst, the heat generated when PM combustion of the DPF occurs can be used effectively.

As the heat accumulating material, for example, inorganic salt, liquid metal such as $KNO_3$, LiOH, KF—LiF—$MgF_2$—NaF, etc can be used.

Further, it is within the present invention to thermally connect the DPF and the catalyst by a heat pipe and to heat-exchange the catalyst and the PM combustion heat by using an exhaust path.

Further, in the present invention, a layout and positional relation of the DPF and the catalyst is not limited.

In the engine exhaust flow path, it is possible to arrange the DPF at the upstream side of the catalyst or to arrange the catalyst at the upstream side of the DPF.

It is not prevented to provide a rectifier between the DPF and the catalyst or at their front or backside.

Further, it is unnecessary for each of the DPF and the catalyst to be single, but it is possible to provide a plurality of DPF and catalysts.

In the case where the catalyst is arranged upstream of the DPF in the engine exhaust flow, most of the PM combustion heat is exhausted out of the exhaust gas purification apparatus together with the exhaust gas flow, however, according to the method of the present invention, exhausting out of the heat is delayed and the present invention effectively functions.

The method of the present invention can be further variously modified as follows.

A temperature raising part which is a means for raising temperature is provided upstream of a PM removal part or PM removal device which is a means for trapping and removing PM such as a DPF, a purifying part or purifying device which is a means for purifying NOx, HC, CO, etc, through contact, and a heat transfer part or heat transfer device which is a means for the heat generated in the PM removal device to the purifying device of NOx, HC, CO, etc.

Tightening of the regulation of exhaust gas emission of vehicles makes it necessary to purify harmful substances such as HC, etc. exhausted immediately after engine starting, that is, it is necessary to rapidly raise the catalyst to a working temperature and to reduce greatly harmful substances emitted until the catalyst reaches to the working temperature range without purifying.

The above-mentioned construction can attain reduction of a quantity of emission of HC, CO, etc, at the time of engine starting. An electric heater, control of fuel injection timing, etc. can be applied for the temperature raising device.

Further, the catalyst according to the present invention can be applied in various shapes. The catalyst can be applied in various shapes such as a honeycomb shape obtained by coating catalyst components on a cordierite honeycomb and a honeycomb structural body formed of metal material such as stainless, a pellet shape, a plate shape, a particle-shape and powder.

The present invention relates to an exhaust gas purification apparatus for purifying harmful substances such as particulates (PM), carbon monoxide (CO), hydrocarbon (CO), nitrogen oxides (NOx), etc contained in the gas exhausted from an internal combustion engine of vehicles or the like, and, particularly, to an exhaust gas purification apparatus for internal combustion engines for raising a purification ratio of the harmful components by keeping the temperature of the exhaust gas purification apparatus to be proper.

The present invention will be explained more in detail by embodiments of the present invention. The invention is not limited to the following embodiments and examples, but includes various embodiments within the concept of the invention.

FIG. 1A is a sectional view of an internal combustion engine exhaust gas purifying system including an exhaust gas purification apparatus of an embodiment of the present invention.

In FIG. 1A, a diesel particulate filter (DPF) 3 for trapping particulates (PM) in an exhaust gas is provided in an exhaust flow path 2 of a diesel engine 1 having a combustion chamber into which fuel is injected by a high pressure pump and an exhaust gas purifying catalyst 4 is provided downstream of the DPF 3.

The DPF 3 and the exhaust gas purifying catalyst 4 are accommodated in a single substantially cylindrical case or container 5 made of SUS which is good heat conductive material. A heat insulator is used for the outer surface of the container 5 if necessary, thereby to prevent heat release from the outer surface.

A section of the exhaust gas purification apparatus, taken along a line 1B—1B is shown in FIG. 1B.

The entire inner wall surface of the container 5 is in contact with the DPF 3 and the exhaust gas purifying catalyst 4 without intervening any heat insulator therebetween.

The engine functions as follows:

In the diesel engine 1, since fuel is injected directly into the combustion chamber, PM can not help occurring.

The PM are contained in the exhaust gas, led to the DPF 3 provided in a flow path through the exhaust flow path 2, and trapped by the DPF 3.

The DPF 3 increases in pressure loss by trapping the PM, so that it is necessary to remove the PM from the DPF 3.

Removal of the PM, that is, regeneration of the DPF 3 is performed by combustion of the PM.

The combustion of PM is performed, for example, by producing a rich exhaust gas through air-fuel ratio control and burning it at the DPF or the like, or by increasing a quantity of un-burnt components and burning them at the DPF or the like.

The heat generated by regeneration of the DPF, that is, the combustion heat of the PM is transferred to the exhaust gas purification catalyst 4 through the container 5, provided for containing therein the DPF and the catalyst and containing a good heat conductor.

The temperature of the exhaust gas purification catalyst is raised by the heat transferred thereto and is held in a working temperature range which is suitable for the catalyst, as shown in FIG. 9.

Further, since the PM combustion heat is transferred to the exhaust gas purifying catalyst 4, the DPF 3 results in losing of the heat, so that abnormal temperature rising of the DPF 3 is suppressed and its thermal deterioration is prevented.

As mentioned above, regeneration of the DPF 3, temperature rising of exhaust gas purifying catalyst 4 to a proper working temperature range, and suppression of abnormal temperature rising of the DPF 3 can be attained simultaneously.

Figure 2:
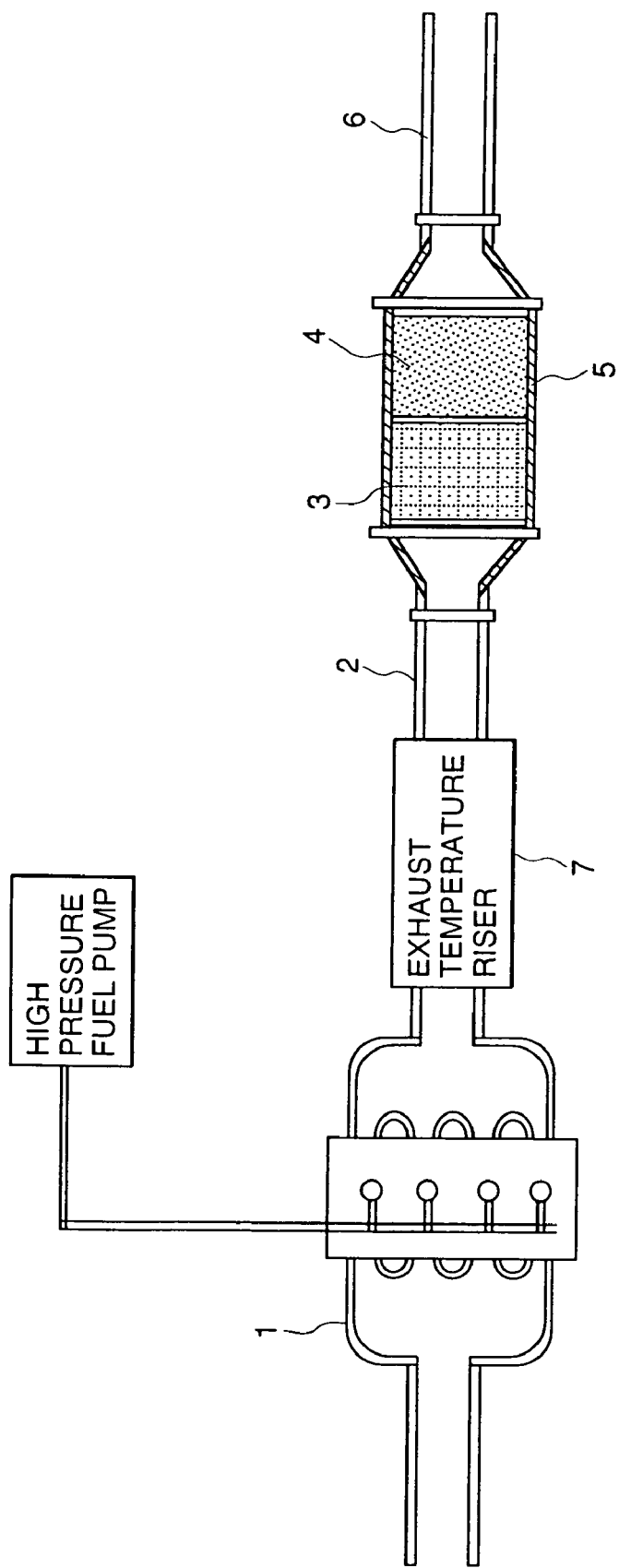
FIG. 2 is a sectional view of an exhaust gas purification apparatus of another embodiment of the invention, in which an exhaust gas temperature raising means is provided upstream of a DPF and an exhaust gas purifying catalyst.

FIG. 2 shows another embodiment of the present invention.

A difference between the present embodiment and the embodiment of FIGS. 1A and 1B is that an exhaust gas temperature raising part 7 is provided upstream of the DPF 3 and the exhaust gas purifying catalyst 4.

The exhaust gas from the diesel engine 1 is led to the DPF 3 downstream of the exhaust gas temperature raising part 7 after being heated by the exhaust gas temperature raising part 7.

The DPF 3 and the PM trapped by the DPF 3 are raised in temperature by the exhaust gas and ignited to burn.

Combustion heat of PM is led to the exhaust gas catalyst 4 through the container 5 constructed so as to contain the good heat conductor, whereby the exhaust gas purifying catalyst 4 is raised in temperature to a suitable working temperature range and abnormal temperature rising of the DPF 3 are suppressed, which is as mentioned above.

An electric heater can be used for the exhaust gas temperature raising part 7. An electric catalyst in which a catalyst component is supported on an electric conductor can be used for the electric heater.

Figure 3A:
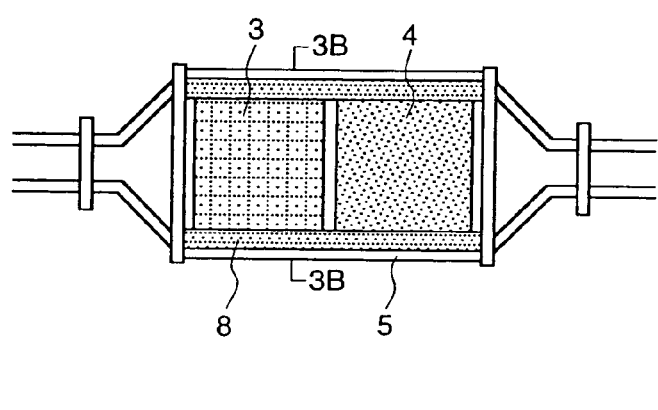
FIG. 3A is a sectional view of a part of an exhaust gas purification apparatus of another embodiment of the invention, in which a DPF and exhaust gas purifying catalyst are enclosed by a good heat conductor.

FIG. 3A shows another embodiment of the present invention.

From FIG. 3A onward, only a container accommodating a DPF and catalyst is illustrated.

A difference between the present embodiment and the embodiment of FIGS. 1A and 1B is that the DPF 3 and the exhaust gas purifying catalyst 4 are enclosed by a single good heat conductor 8.

Figure 3B:
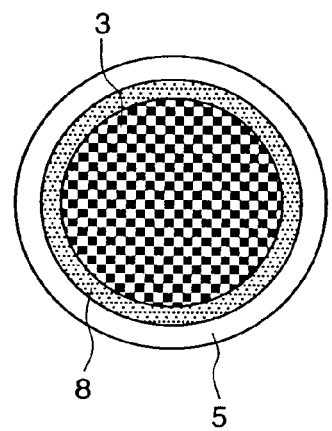
FIG. 3B is a sectional view of a DPF part of the exhaust gas purification apparatus of FIG. 3A, taken along a line 3B—3B.

A section of the exhaust gas purifying catalyst is shown in FIG. 3B. An inner wall surface of the container 5 is in contact with the DPF 3 and the exhaust gas purifying catalyst 4 through the good heat conductor 8.

By transferring the combustion heat of PM generated at the DPF 3 to the exhaust gas purifying catalyst 4 through the good heat conductor 8, suppression of temperature rising of the DPF 3 and temperature rising of the exhaust gas purifying catalyst 4 to a suitable temperature range can be effectively performed.

It is possible to make the good heat conductor 8 have a function of preventing displacement of the position of the exhaust gas purifying catalyst 4, a function of preventing gas leakage from gaps between the container 5 and the DPF 3 and/or the exhaust gas purifying catalyst 4, and a function of absorbing vibrations, other than the inherent heat conducting function for the present invention.

Figure 4:
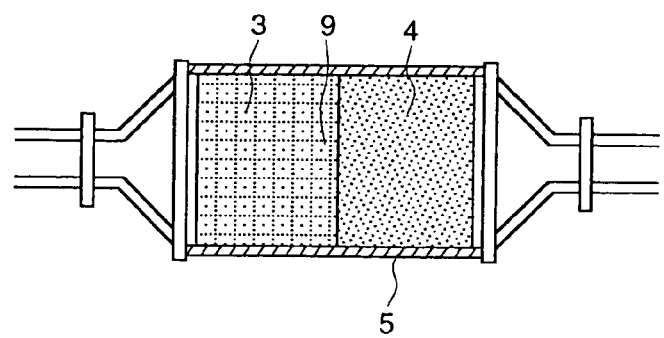
FIG. 4 is a sectional view of a part of an exhaust gas purification apparatus of another embodiment of the invention, in which a DPF and exhaust gas purifying catalyst are integrated in an integrated one body.

FIG. 4 shows a further another embodiment of an exhaust gas purification apparatus of the present invention.

A difference between the present embodiment and the embodiment of FIGS. 1A and 1B is that the DPF 3 and the exhaust gas purifying catalyst 4 are integrated into an integrated structure 9, and a substrate of the catalyst is made of metal material.

As the integrated structure 9, a three-dimensional mesh-shaped porous body of which a front portion is made as a filter and a back portion has a catalyst component supported thereon, and a sintered porous metal body constructed the same as the above can be applied.

Further, an integrated structure 9, which is formed by welding to connect a filter composed of a three-dimensional mesh-shaped porous metal body, a sintered porous metal body or wire meshes to a so-called metal honeycomb structure formed by adhering and working stainless plates into a honeycomb structure, also can be applied.

Figure 5A:
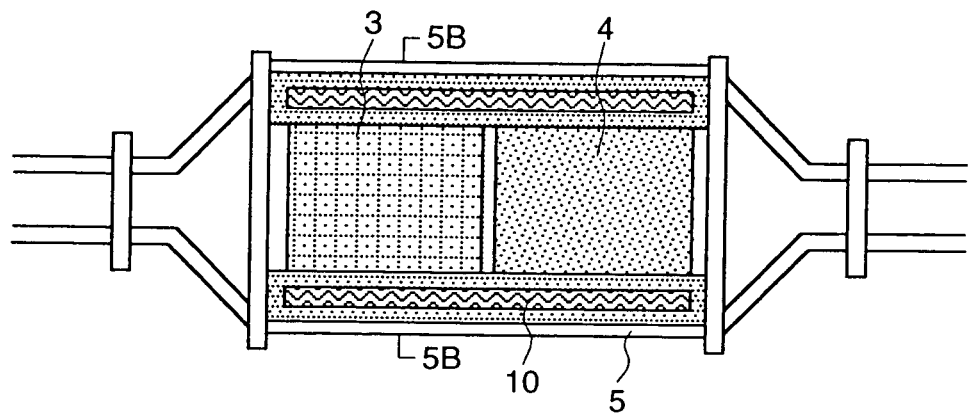
FIG. 5A is a sectional view of an exhaust gas purification apparatus of another embodiment of the invention, in which a DPF and an exhaust gas purifying catalyst are enveloped by a heat accumulating member.

FIG. 5A shows a further another embodiment of the present invention.

A difference between the present embodiment and the embodiment of FIGS. 1A and 1B is that the DPF 3 and the exhaust gas purifying catalyst 4 in the exhaust pipe 2 are surrounded by a heat accumulating member 10.

Figure 5B:
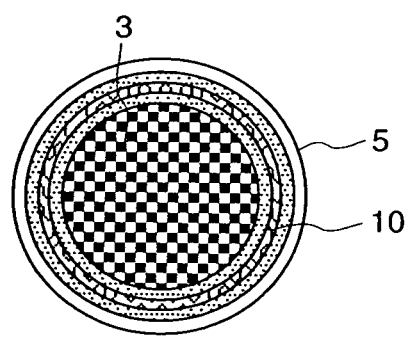
FIG. 5B is a sectional view of a DPF part of the exhaust gas purification apparatus of FIG. 5A, taken along a line 5B—5B.

A section of the exhaust gas purification apparatus is shown in FIG. 5B. The inner wall surface of the container 5 is thermally connected with the DPF 3 and the exhaust gas purifying catalyst 4 through the heat accumulating material 10.

By transferring the heat from the DPF 3 to the exhaust gas purifying catalyst 4 through the heat accumulating member 10, a heat transfer quantity can be flattened, and suppression of temperature rising of the DPF 3 and temperature rising of the exhaust gas purifying catalyst 4 to a suitable temperature can be more effectively performed, that is, can be performed so as to last longer in the more proper temperature range.

Figure 6:
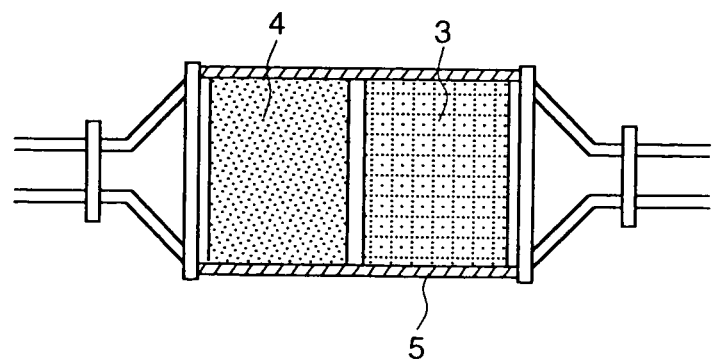
FIG. 6 is a sectional view of a part of an exhaust gas purification apparatus of another embodiment of the invention, in which a DPF and exhaust gas purifying catalyst, in which the exhaust gas purifying catalyst is arranged of upstream of a DPF.

FIG. 6 is a modification of the embodiment of FIGS. 1A and 1B, in which the exhaust gas purifying catalyst 4 is arranged upstream of the DPF 3 in the exhaust flow inside the container 5 containing a single good heat conductor.

In the construction, in the case where there is sufficient heat transfer between the container 5 and the exhaust gas purifying catalyst 4 and the DPF 3, more of the PM combustion heat in the DPF 3 is taken out by the exhaust gas, and the heat does not serve temperature raising of the exhaust gas purifying catalyst.

According to the present embodiment of the invention, the PM combustion heat generated at the DPF 3 flows in a reverse direction to the exhaust gas flow, and is used for temperature raising of the exhaust gas purifying catalyst 4.

A relative positional relation between the DPF 3 and the exhaust gas purifying catalyst 4, that is, arrangement of the exhaust gas purifying catalyst 4 at the upstream side of the DPF 3 can be applied for all the embodiments shown in FIG. 1A to FIG. 5B. In any case, the PM combustion heat at the DPF 3 at the downstream side is transferred to the exhaust gas purifying catalyst 4 at the upstream side through the container 5, the good heat conductor 8 or the heat accumulating member 10, and can attain the same function and effect as in the embodiment of FIG. 6.

Figure 7:
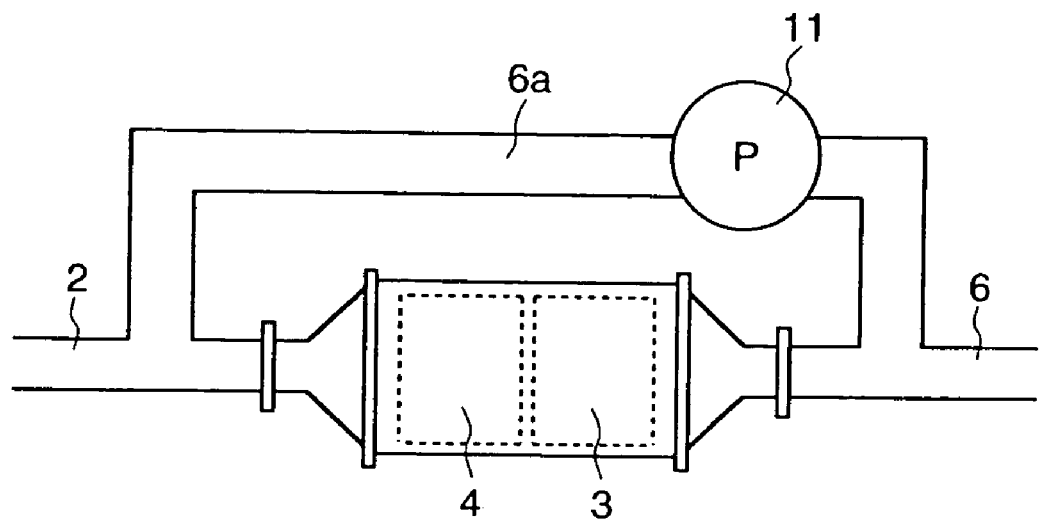
FIG. 7 is a schematic diagram of an exhaust gas purification apparatus of another embodiment of the invention, in which PM combustion heat at a DPF is transferred to an exhaust gas purifying catalyst by exhaust gas.

FIG. 7 shows further another embodiment of the present invention.

A difference between the present embodiment and the embodiment of FIGS. 1A and 1B is that the temperature of the exhaust gas purifying catalyst 4 is raised by using the exhaust gas of high temperature produced when PM is burnt at the DPF 3.

The exhaust gas purifying catalyst 4 is arranged upstream of the DPF 3, and the heat generated when PM is burnt at the DPF 3 is carried on exhaust gas and transferred to the exhaust gas purifying catalyst 4 positioned at the upstream side by using a pump 11 or the like arranged in an exhaust flow path 6a fluidly connected to the exhaust flow paths 2 and 6.

The construction is effective when the DPF 3 is arranged downstream of the exhaust gas purifying catalyst 4.

Figure 8:
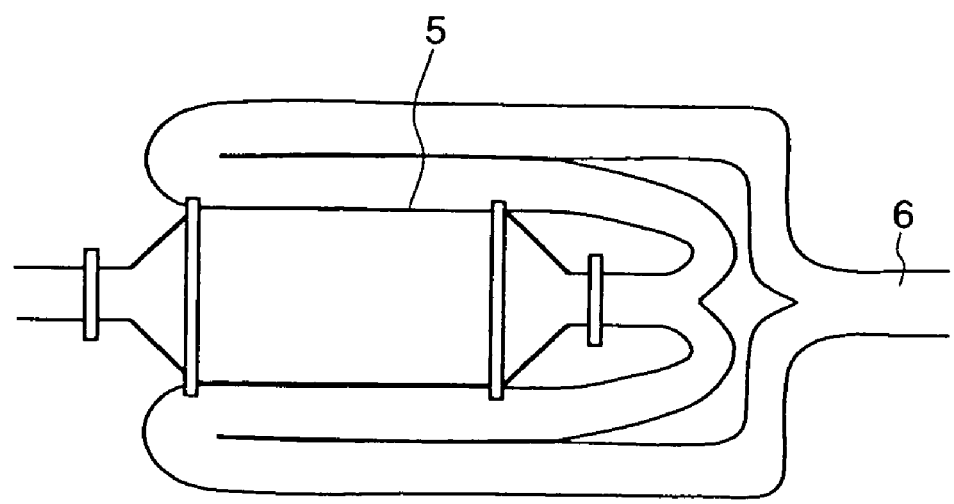
FIG. 8 is a schematic diagram of an exhaust gas purification apparatus of another embodiment of the invention, in which PM combustion heat at a DPF is transferred to an exhaust gas purifying catalyst by exhaust gas.

FIG. 8 shows further another embodiment of the present invention.

A difference between the present embodiment and the embodiment of FIG. 7 is in a shape of the exhaust flow path and a heat transferring construction, and an exhaust gas transfer part of the pump or the like is unnecessary, as compared with FIG. 7.

A part of the exhaust flow path 6 arranged downstream of the container 5 is turned to the container 5 to be in contact with a part of the outer surface of the container 5 and returns to the downward as shown in FIG. 8.

PM combustion heat of the DPF 3 is transferred to a position near to the exhaust gas purifying catalyst 4 which is a heat receiving body by exhaust gas, and then the heat is transferred to the exhaust gas purifying catalyst through the good heat conductor.

In FIG. 8, it is effective as a modification to provide a heat accumulating member between the container 5 and the exhaust flow path.

As mentioned above, according to the present invention, it is possible to effectively purify particulates, NOx, HC, CO, exhausted from an engine.

What is claimed is:

1. An exhaust gas purification apparatus for purifying exhaust gas exhausted from a diesel internal combustion engine and containing therein harmful substances including particulates, NOx, HC and CO, at least, said exhaust gas purification apparatus comprising:
   a removal part for trapping and removing particulates in the exhaust gas;
   a purification part for catalytically purifying NOx, HC and CO through contact; and
   a heat transfer part for transferring heat generated in said removal part to said purification part, and heat transfer part being a container having an inner wall of conductive material and accommodating therein said removal part and said purification part each contacting said inner wall of said container so as to transfer heat generated in said removal part to said purification part.

2. An exhaust gas purification apparatus according to claim 1, wherein said container comprises a single heat conductor at an inner side thereof, said single heat conductor contacting said removal part and said purification part.

3. An exhaust gas purification apparatus according to claim 1, wherein said removal part is a filter composed of porous material or metal material.

4. An exhaust gas purification apparatus according to claim 1, wherein said purification part comprises at least one of the following selected from the group consisting of a three-way catalyst, a firing combustion catalyst, a lean NOx catalyst purifying NOx in lean exhaust gas, an HC adsorption catalyst, and an electric catalyst.

5. An exhaust gas purification apparatus according to claim 1, wherein said heat transfer part includes, at least inner wall of said containing a good heat conductor for transferring heat generated in said removal part conducts and transfers the heat through said good heat conductor.

6. An exhaust gas purification apparatus according to claim 1, wherein said removal part are provided in said container made of good heat conductive material, without a heat insulator intervening between an inner wall surface of said container and an outer wall surface of said container, and the heat generated in said removal part is transferred to said purification part through said container.

7. An exhaust gas purification apparatus according to claim 1, wherein said heat transfer part includes heat accumulating material in an inner wall portion of said container.

8. An exhaust gas purification apparatus according to claim 1, wherein said removal part and said purification part are an integrated structure in which metal material is used as a metal substrate for said purification part.

9. An exhaust gas purification apparatus according to claim 1, wherein said purification part is arranged at an upstream side said removal part.

10. An exhaust gas purification apparatus according to claim 9, an exhaust flow path is fluidly connected to an upstream side of said container at one end thereof and to a downstream side of said container at another end thereof so that exhaust gas including particulates combustion heat generated in said removal part is transferred to said purification part at the upstream side of said removal part.

11. An exhaust gas purification apparatus for purifying exhaust gas exhausted from a diesel internal combustion engine and containing therein harmful substances including particulates, NOx, HC and CO, at least, said exhaust gas purification apparatus comprising:
   a diesel particulate filter for trapping and removing particulates in the exhaust gas;
   a catalyst for catalytically purifying the NOx, HC and CO; and
   a container of heat conductive material for transferring heat generated in said diesel particulate filter to said catalyst, an entire inner wall surface of said container contacting with outer peripheral surfaces of said diesel particulate filter and said catalyst.

12. An exhaust gas purification system comprising:
   an exhaust gas passage for flowing out exhaust gas exhausted from a diesel internal combustion engine, said exhaust gas passage being comprised of an inlet side exhaust path and outlet side exhaust path;
   a removal part for trapping and removing particulates in the exhaust gas;
   a purification part for purifying NOx, HC and CO, included in the exhaust gas; and
   a heat transfer part for transferring heat generated in said removal part to said purification part said heat transfer part including a container having an inner wall surface of heat conductive material connected by said inlet side exhaust path at an upstream side and by said downstream side exhaust path at a downstream side, and accommodating therein said removal part and said purification part so that said inner wall surface contacts both said removal part and said purification part to transfer the heat generated in said removal part to said purification part through said container.

13. An exhaust gas purification system according to claim 12, wherein said exhaust gas purification system has a temperature raising part for heating exhaust gas from said diesel internal combustion engine and raising the temperature of the exhaust gas.

14. An exhaust gas purification apparatus for purifying exhaust gas exhausted from a diesel internal combustion engine, comprising:
   a filter for trapping and removing particulates contained in the exhaust gas from said diesel internal combustion engine;
   a catalyst for catalytically purifying the exhaust gas passed through said filter; and a container provided in an exhaust flow passage so that the exhaust gas from said diesel internal combustion engine flows through said container, said container having an inner wall surface of conductive material and accommodating therein only said filter and said catalyst so that said inner wall surface in its entirety is in contact with both said filter and said catalyst to transfer heat generated in said filter to said catalyst.

* * * * *